United States Patent Office 2,890,876
Patented June 16, 1959

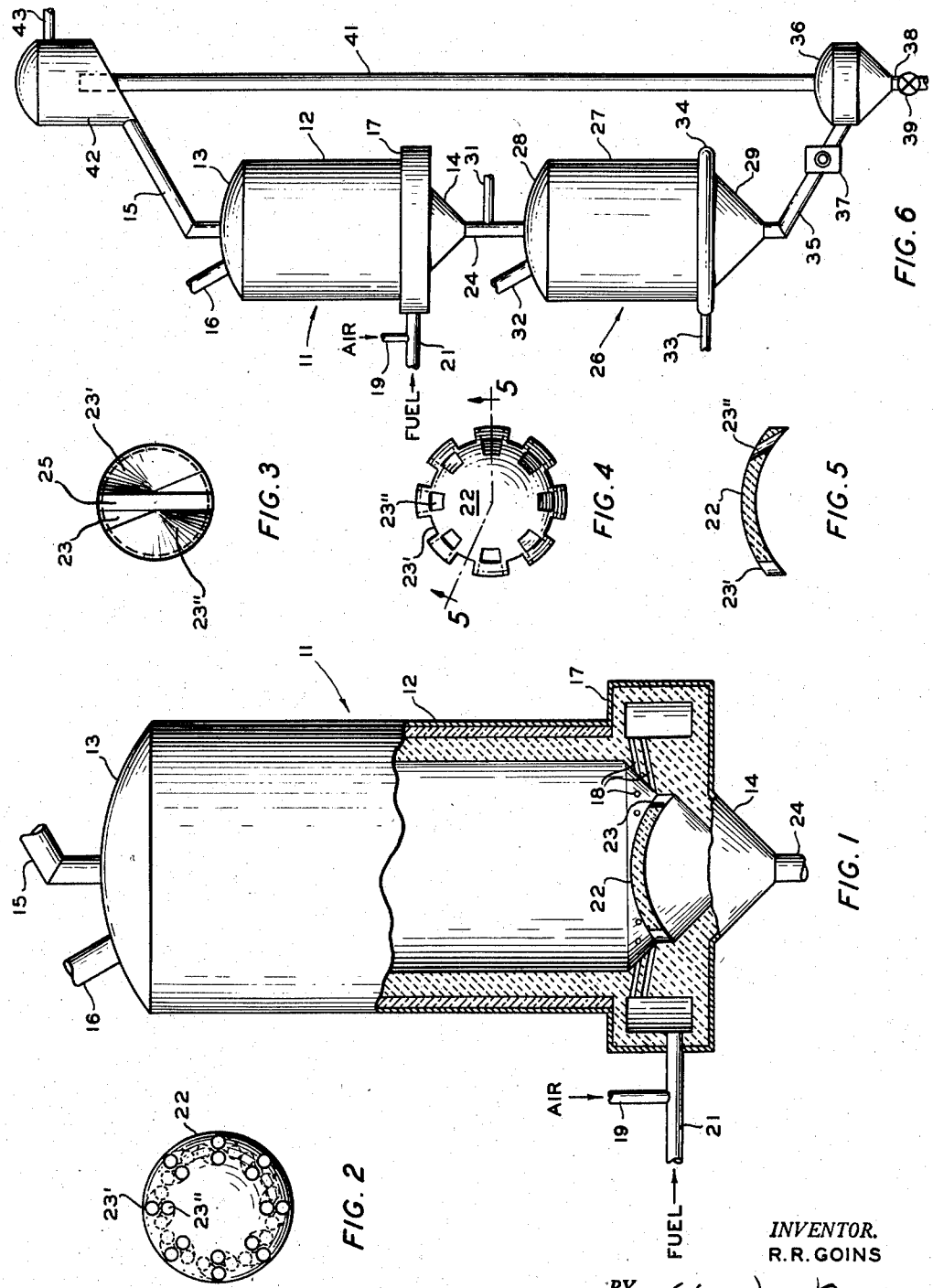

2,890,876

PEBBLE HEAT EXCHANGER

Robert R. Goins, Bartlesville, Okla., assignor to Phillips Petroleum Company, a corporation of Delaware Application December 19, 1952, Serial No. 326,815

1 Claim. (Cl. 263—19)

This invention relates to pebble heat exchangers. In one of its more specific aspects, it relates to improved pebble heater apparatus. In another of its more specific aspects, it relates to means for equalizing the temperature of pebbles delivered to the reaction chamber of pebble apparatus. In another of its more specific aspects, it relates to the conversion of hydrocarbons in pebble heater apparatus.

Apparatus of the so-called "pebble heater" type has been utilized in recent years for the purpose of heating fluids to elevated temperatures. Such apparatus is especially suited for use in temperature ranges above those at which the best available higher temperature structural alloys fail. Thus, such equipment may be used for superheating steam or other gases or for the pyrolysis of hydrocarbons to produce various products, such as ethylene and acetylene, as well as for other reactions and purposes. Conventional pebble heater type apparatus includes two refractory lined contacting chambers disposed one above the other and connected by at least one uninterrupted refractory lined passageway or pebble throat of relatively narrow cross-section.

Refractory solids of flowable size and form, called "pebbles," in conventional apparatus pass continuously and contiguously from the upper end of the pebble heating chamber through the system to the lower end of the reaction chamber, flowing by gravity through the uppermost chamber, the throat and the lowermost chamber, and are then conveyed to the top of the uppermost chamber to complete the cycle.

Solid heat exchange material which is conventionally used in pebble heater type apparatus is generally called "pebbles." The term "pebbles" as used herein denotes any solid refractory material of flowable size and form, having strength, which is suitable to carry large amounts of heat from the pebble heating chamber to the gas heating chamber without rapid deterioration or substantial breaking. Pebbles conventionally used in pebble heater apparatus are ordinarily substantial spherical in shape and range from about ⅛ inch to about 1 inch in diameter. In a high temperature process, pebbles having a diameter of between ¼ inch and ⅜ inch are preferred. The pebbles must be formed of a refractory material which will withstand temperatures at least as high as the highest temperature attained in the pebble heating chamber. The pebbles must also be capable of withstanding temperature changes within the apparatus. Refractory materials, such as metal alloys, ceramics, or other satisfactory materials may be utilized to form such pebbles. Silicon carbide, alumina, periclase, beryllia, Stellite, zirconia and mullite may be satisfactorily used to form such pebbles or may be used in admixture with each other or with other materials. Pebbles formed of such materials, when properly fired, serve very well at higher temperatures, some withstanding temperatures up to about 4000° F. Pebbles which are used may be either inert or catalytic as used in any selected process.

The pebbles are heated in one of the chambers, preferably the upper one, by direct contact therein with hot gases, usually combustion products, to temperatures generally in the range of 1400° F. to 3200° F. The hot pebbles are then gravitated into a reactor chamber where they are contacted with a fluid to be superheated or reacted, as the case may be. In conventional apparatus, gas flow patterns in the pebble heating chamber are such that pebbles of decidedly different temperature are gravitated from the pebble heating chamber through the pebble throat into the reaction chamber as distinct unmixed but contiguous pebble streams.

Some pebble heating chambers are provided with firing chambers which are positioned as bustle rings about the lower end portion of the pebble heater chamber. In such a heating chamber, the pebbles flowing through the peripherial portion of the pebble bed within that chamber, are heated to temperatures substantially higher than those pebbles flowing through the axial portions of the same pebble bed. This uneven temperature of pebbles results in zones of different temperatures within the reaction zone. The result of this type of operation is that non-uniform reaction or heating of the gaseous material is obtained in the lower chamber. Generally, pebble inlet temperatures in the lower chamber are about 100° F. to 200° F. below the highest temperature of the pebbles within the first chamber. In processes for the production of ethylene from light hydrocarbons such as ethane, propane, or butane the pebble temperature in the reaction chamber, is usually in the range of 1200° F. to 1800° F. For the production of acetylene by pyrolysis of hydrocarbons, temperatures in the range of 1600° F. to 3000° F. are desirable.

As pointed out above, considerable trouble has been encountered in the operation of pebble heater apparatus for the reason that pebbles which are heated in the pebble heating chamber are not all heated to uniform temperatures. For this reason, the pebbles which are introduced into the upper end portion of the reaction chamber lack the desired uniformity of temperature which gives the best reaction of feed within that reaction chamber. A result has been that a portion of the feed stock has been overcracked and a portion of the feed stock has been undercracked by reason of the contact with pebbles heated to temperatures above and below that desired for proper reaction of the feed. This difficulty in obtaining uniform temperatures of pebbles within the pebble heating chamber is due principally to the fact that the pebble heating chamber is one of large cross-section, and gas flow patterns within such a chamber containing a contiguous gravitating pebble mass are such as to permit a considerably greater contacting time between gas and pebbles in one section of the chamber than is obtained in another section of the same chamber.

The objects of this invention are attained by at least one of the aspects of the invention.

An object of this invention is to provide improved pebble heater apparatus. Another object of the invention is to provide the means for mixing small portions of hot pebbles with small portions of cooler pebbles, in the lower end of the pebble heater chamber. Another object of the invention is to provide means for withdrawing pebbles from the pebble heater chamber at its lower end and adjacent the periphery of the chamber when a peripheral firing chamber is used. Another object of the invention is to materially reduce temperature differentials of pebbles withdrawn from the lower end of a pebble heater chamber. Another object of the invention is to provide an improved method for reacting hydrocarbons in pebble heater apparatus. Other and further objects and advantages will be apparent to those skilled in the art upon study of the accompanying discussion and the drawing.

Broadly speaking, this invention comprises means for obtaining mixing of pebbles of dissimilar temperatures within the lower portion of the pebble heater chamber. This mixing of pebbles is obtained by withdrawing separate streams of pebbles of dissimilar temperatures from points above a baffle placed in the lower end portion of a pebble heater chamber and delivering those streams of pebbles to a common annulus below the baffle. In one modification, the pebbles can be withdrawn from common radii and the streams of pebbles rotated so as to emerge from the conduits conveying those pebbles onto a common annulus as adjacent streams on different radii. A second modification of this invention utilizes alternate conduits withdrawing pebbles from points adjacent the periphery of the chamber and withdrawing pebbles from points removed from the periphery of the chamber. These alternate conduits are disposed on different radii and deliver the streams of pebbles which pass therethrough to a common annulus but to points on that annulus which are also located on different radii.

Better understanding of this invention will be obtained upon reference to the drawings in which Figure 1 is a sectional elevation of a pebble heater chamber.

Figure 2 is a view of a pebble baffle showing placement of pebble conduits therethrough.

Figure 3 is a modification of the pebble conduits shown in Figure 1. Thus, Figure 3 is an enlarged top view of a modification of conduits 23 shown in Figure 1, and contains a baffle as described hereafter.

Figure 4 is a modification of the pebble baffle shown in Figure 1.

Figure 5 is a sectional view of the baffle taken on the line 5—5 of Figure 4.

Figure 6 is a schematic flow diagram of the pebble heater system of this invention.

Referring particularly to the device shown in Figure 1 of the drawings, pebble heater chamber 11 comprises an upright elongated shell 12 closed at its upper and lower ends by closure members 13 and 14, respectively. Pebble inlet conduit 15 is provided in the upper end of chamber 11 and may be a single conduit, as shown, or may be a plurality of conduits distributed over the upper end of chamber 11. Effluent outlet conduit 16 extends from the upper end of chamber 11. Combustion chamber 17 is provided about the lower end portion of shell 12 and communicates with the chamber formed within shell 12 by means of conduits 18. Individual burners positioned at the lower end and periphery of chamber 11 can also be used. Combustible materials are supplied to combustion chamber 17 by means of conduits 19 and 21. A transverse refractory arch or pebble baffle 22 is provided in the lower end portion of the chamber formed within shell 12 and is provided at its periphery with a plurality of conduits 23 which communicate with the chamber above arch 22 and the chamber section below that arch. The specific form of conduits 23 is more fully shown in Figures 2, 3 and 4 of the drawings. Pebble outlet conduit means 24 is provided in the lower end of chamber 11. It should be noted that the heating of the gaseous material may take place at a point outside of the combustion chamber 17, utilizing a distribution chamber such as 17 for distributing the gaseous material to conduit 18.

Referring particularly to the device shown in Figure 2 of the drawings, it will be noted that conduit 23 is made up of two individual conduits 23' and 23". Conduits 23' extend from points adjacent the periphery of the chamber and conduits 23" extend from points removed from the periphery. Conduits 23' and 23" are in the form of helices rotating on a steep incline throughout their length. The rotation is sufficient to deliver streams of pebbles obtained from different annuli to adjacent points on the same annulus.

Referring particularly to Figure 3 of the drawings, conduit 23 is modified by a baffle 25 which extends downwardly through that conduit, dividing it into two sections 23' and 23". The baffle is helical in form although the slope of the helix is quite great. The twist of the helical baffle is only sufficient to transport streams of pebbles from points of dissimilar pebble temperatures on different annuli above baffle 22 to adjacent points on a common annulus below baffle 22.

Referring particularly to the device shown in Figure 4 of the drawings, conduits 23' and 23" are alternately disposed on adjacent radii of dome 22 so as to withdraw pebbles from different annuli and adjacent radii of the pebble chamber above arch 22 and to deliver them to a common annulus and adjacent radii below the arch 22 as shown in Figure 5 of the drawing.

Referring particularly to the device shown as Figure 6 of the drawing, parts which are identical to those described in connection with Figure 1 are indicated by like numerals. Reaction chamber 26 comprises an upright elongated shell 27, closed at its upper and lower ends by closure members 28 and 29, respectively. Pebble outlet conduit 24 from pebble heater chamber 11 is connected through closure member 28 to the interior of chamber 26. A sealing gas inlet conduit 31 is connected to conduit 24 intermediate its end for the introduction of an inert sealing gas to prevent flow of gases from one chamber to the other. Effluent outlet conduit 32 extends from the upper end portion of chamber 26. Inlet means for the gaseous materials to be heated or converted within chamber 26 comprises conduit 33 and header member 34 communicating with the interior of chamber 26, preferably through closure member 29. It should be noted that although a single pebble conduit 24 is shown in the drawings, a plurality of such conduits may be utilized to convey pebbles from the lower end portion of chamber 11 into the upper end portion of chamber 26.

Pebble outlet conduit 35 extends downwardly through the lower end portion of chamber 26 and is connected at its lower end to pebble entraining chamber 36. Flow controller 37 is provided intermediate the ends of conduit 35. Flow controller 37 may be any conventional type of pebble flow controller, such as a star valve, a gate valve, a vibratory feeder, a rotatable table feeder or the like. Elevating gas inlet conduit 38 extends into the lower end portion of entraining chamber 36 and is provided with a flow control valve 39 intermediate its ends. Elevator conduit 41 extends upwardly from entraining chamber 36 and is disposed coaxially with respect to conduit 38. Gas-pebble separator chamber 42 encloses the upper end portion of elevator conduit 41 and is provided in its upper end portion with gaseous effluent outlet conduit 43. Chamber 42 is connected at its lower end portion to the upper end of pebble inlet conduit 15.

In the operation of the device shown in Figure 6 of the drawings, pebbles are introduced into the upper end portion of pebble heating chamber 11 forming a contiguous, gravitating, gas-pervious mass therein. A combustible mixture is introduced into combustion chamber 17 where it is burned at a high temperature and the hot combustion gases are introduced into the lower end portion of the gravitating gas-pervious mass of pebbles through conduits 18. The hot gases pass inwardly and upwardly through that gravitating pebble mass, heating the pebbles in a direct heat exchange, and are removed from the upper end portion of that chamber through gaseous effluent outlet conduit 16. Since the gases tend to take a path of least resistance through the gas-pervious pebble mass, the pebbles in the peripheral portion of the pebble bed tend to become heated to a higher temperature than the pebbles flowing within the axial portion of that bed.

The heated pebbles are withdrawn from the pebble heating zone above refractory arch 22 through pebble conduits 23. When utilizing the modifications shown in Figures 2 or 3 of the drawings, the portion of the pebbles which has been heated to a higher temperature in the peripheral portion of the pebble bed enters conduit 23' and a portion of pebbles which has been heated to a lower temperature in the direct heat exchange with the combustion gas enters conduit 23". These pebbles pass downwardly through conduit 23 but are caused to be rotated into position so that they emerge from conduit 23 as adjacent streams on a common annulus but positioned on different radii of chamber 11. Thus, alternate small streams of hot and cooler pebbles are introduced onto a common annulus below refractory arch 22, thereby causing mixing of the pebbles to such an extent that the pebbles tend to reach a common temperature before they pass through conduit 24 into reaction chamber 26.

The pebbles gravitate through conduit 24 as a contiguous pebble mass and form a contiguous gravitating gas-pervious mass within reactor chamber 26. Gaseous material which is to be heated or converted, as the case may be, in chamber 26 is introduced into the lower end portion of chamber 26 through inlet conduit 33 and header member 34. That gaseous material passes upwardly through the gas-pervious gravitating pebble mass being raised to the desired heating or conversion temperature by the direct heat exchange with the gravitating mass of pebbles. The gaseous effluent is removed from the upper end portion of that chamber through gaseous effluent outlet conduit 32. Pebbles which have been cooled in the direct heat exchange within chamber 26 are gravitated from that chamber through pebble outlet conduit 35. The removal of the pebbles from chamber 26 is controlled by pebble flow controller 37. The pebbles are permitted to gravitate into entraining chamber 36 wherein entraining gas is introduced through valve 39 and conduit 38 so as to entrain the pebbles and carry them upwardly through elevator conduit 41. The pebbles and gaseous materials are separated in chamber 42, the pebbles gravitating to the lower end portion of that chamber and the entraining gas being removed from the upper end portion of that chamber through conduit 43. The pebbles are permitted to gravitate from chamber 42 through conduit 15 into the upper end portion of chamber 11 wherein they form the contiguous, gravitating, gas-pervious mass within that chamber.

When conduits 23' and 23" are provided in refractory arch 22, those conduits are preferably unobstructed by baffle members of any sort. Thus, the pebbles are withdrawn from different annuli within the chamber above refractory arch 22 and are delivered to a common annulus below arch 22. The arrangement of pebble conduit inlets is immaterial so long as pebbles which are of dissimilar temperatures are delivered to adjacent points on a common annulus. In this manner, small portions of pebbles of different temperatures are mixed so as to permit them to reach a substantially common temperature before being introduced into the upper end portion of the reaction chamber 26. By mixing the pebbles in this manner, even though complete heat exchange does not occur between the pebbles of different temperatures, the pebbles are so completely mixed before they pass through the throat 24, that no definite zones of overcracking or undercracking are encountered in the reaction chamber by reason of this non-uniform heating of pebbles within the pebble heater chamber.

Various modifications of this invention will be apparent to those skilled in the art upon study of the accompanying disclosure. Such modifications are believed to be within the spirit and the scope of this invention.

I claim:

A pebble heat exchange chamber comprising a closed, upright, elongated shell; pebble inlet means in the upper end of said shell; gaseous effluent outlet means in the upper end portion of said shell; pebble outlet means in the lower end of said shell; an annular peripheral gas distribution chamber at the lower end of said shell; a plurality of gas inlet conduits spaced around the periphery of said heat exchange chamber extending from said gas distribution chamber into the chamber formed by said shell; inlet conduit means in said gas distribution chamber; a baffle member in the lower end of said shell below said gas inlet conduits from said gas distribution chamber, transverse to the gravitational flow of pebbles through said chamber; and a plurality of circular conduits extending through said baffle member adjacent the periphery of said heat exchange chamber to points on a common annulus below said baffle; an upright partition in each conduit in said baffle said partition being transverse to the radii of said heat exchange chamber at its upper end and being helical in its length so as to form pairs of conduits terminating on a common annulus.

References Cited in the file of this patent

UNITED STATES PATENTS

| | | |
|---|---|---|
| 2,412,136 | Evans et al. | Dec. 3, 1946 |
| 2,458,350 | Crowley | Jan. 4, 1949 |
| 2,514,722 | Robinson | July 11, 1950 |
| 2,534,752 | Beckerberger | Dec. 19, 1950 |
| 2,554,407 | Hepp | May 22, 1951 |
| 2,596,610 | Shabaker | May 13, 1952 |